UNITED STATES PATENT OFFICE.

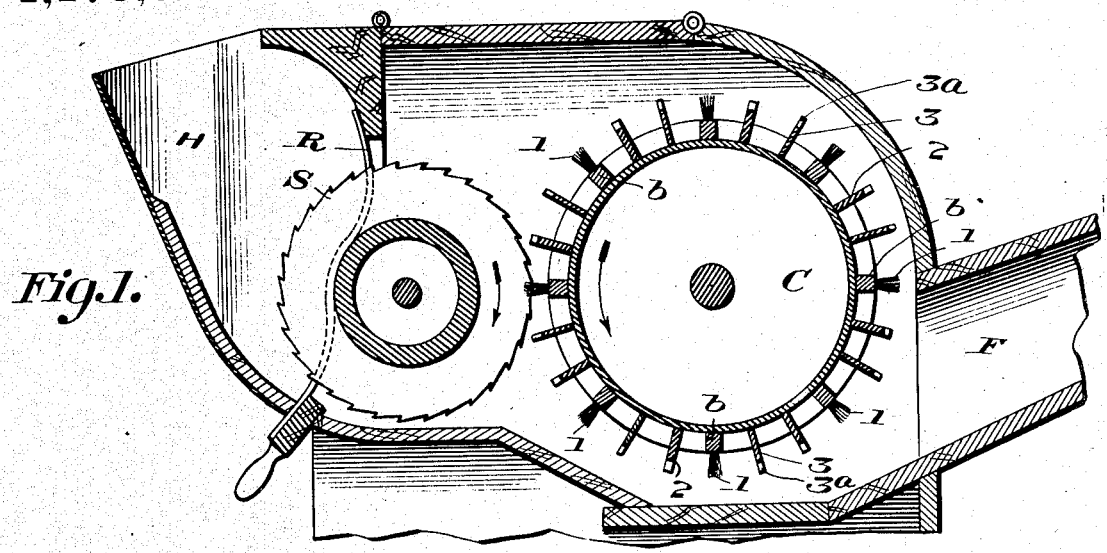
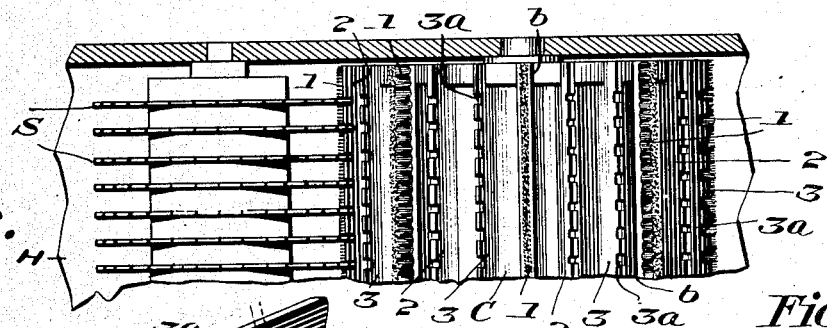
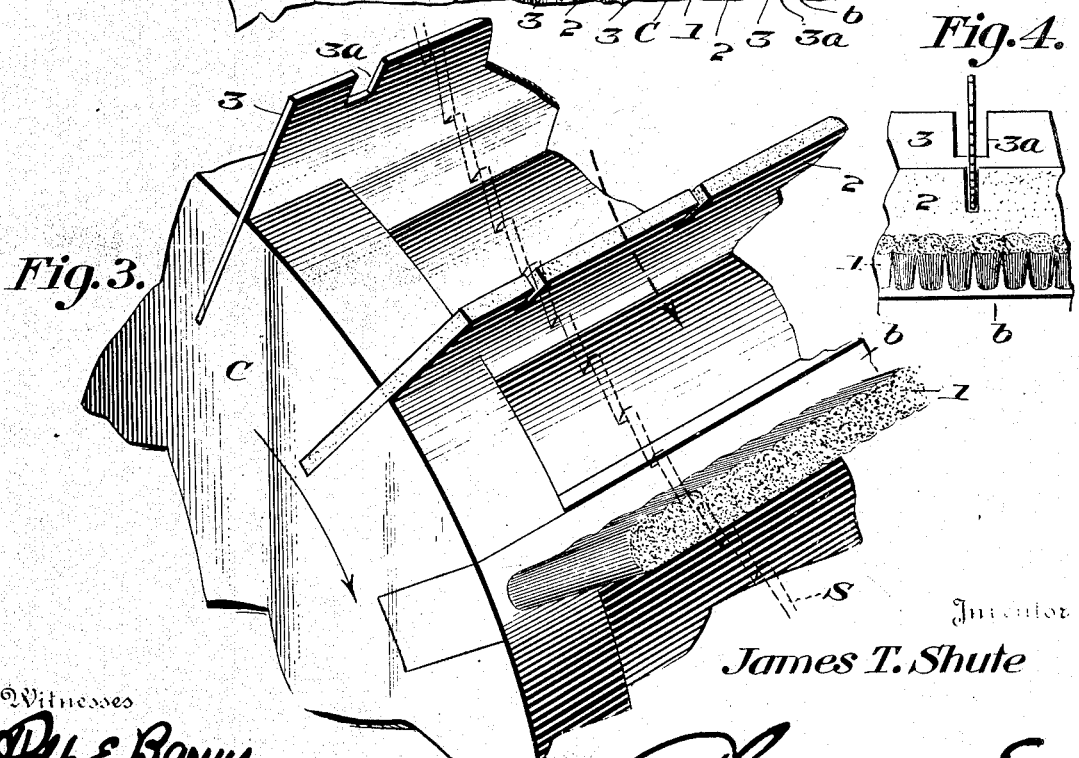

JAMES T. SHUTE, OF MONROE, NORTH CAROLINA.

COTTON-GIN.

1,175,664.   Specification of Letters Patent.   Patented Mar. 14, 1916.

Application filed January 12, 1916. Serial No. 71,756.

*To all whom it may concern:*

Be it known that I, JAMES T. SHUTE, a citizen of the United States, residing at Monroe, in the county of Union and State of North Carolina, have invented certain new and useful Improvements in Cotton-Gins; and I hereby declare that the following is a full, clear, and exact description thereof, reference being had to the accompanying drawings, which form part of this specification.

This invention relates to cotton gins, and has particular reference to the cylinder for removing cotton from the gin saw.

The objects of the invention are to prevent the gin saws clogging in case the cotton should be damp, to insure removal of all cotton from the saw, to prevent cutting of the cotton, to open up or disintegrate any pellets or masses of damp cotton that might be taken from the saws by the brushes or cleaners, and to obviate any danger of producing sparks by friction between the cleaners and saws or passages of the foreign substances between the saws and cleaning cylinder.

The invention resides in certain novel features of construction of the cylinder by which the cotton is removed from the gin saws. In accordance with this invention such cylinder is provided with a plurality of longitudinally disposed brushing, cleaning and beating members arranged in succession. Each brush member may be of the usual type and is preferably formed of bristles arranged in a row in a suitable backing and attached to the periphery of the cylinder, and adapted to remove light or loose cotton from the saw teeth. Following each brush member on the cylinder is a cleaning member, which is preferably composed of a strip of leather, rubber or suitable composite material suitably secured to the periphery of the cylinder; said cleaning member being stiffer than the brush but preferably slightly elastic or resilient; said cleansing member is slotted on its outer edge so that it can pass the saw, but the sides of the slots will remove any wet or gummy particles of cotton adhering to the saw teeth not removed by the brushes. Following each semi-resilient cleaning member is a beating member, preferably composed of a thin strip of iron or steel having its outer edge provided with slots much wider than the slots in the cleaning member so that it can freely pass the saw blades; said beater member is adapted to strike any pellets or knots of cotton removed from the saw and break up or loosen such pellets or clogged bits of cotton.

I will explain the invention more fully with reference to the accompanying drawings and summarize in the claims the essential features thereof for which protection is desired.

In said drawings: Figure 1 is a detail sectional view of part of a cotton gin having a cleaning cylinder constructed in accordance with my invention. Fig. 2 is a detail plan view of a section of the gin saws, and of the cleaning cylinder. Fig. 3 is an enlarged perspective view of part of the cleaning cylinder. Fig. 4 is a detail diagrammatic view.

The gin may in general be of any preferred construction, and is shown as having a hopper H, a series of saws S, ribs R, and a flue F, and a brushing cleaning and beating cylinder C; these parts, with the exception of the brushing, cleaning and beating members on the cylinder, hereinafter described, may be constructed and arranged to operate in the usual manner, and will be readily understood by those familiar with gins, and need no further detailed illustration or explanation. The brush cylinder should as usual be rotated at a much higher peripheral speed than the saws.

The cylinder C is provided on its periphery with a series of longitudinally disposed brushing members 1, cleaning members 2, and beating members 3; each of which members is arranged longitudinally of the cylinder; and the members 1, 2, 3, are arranged in sets, and preferably in the order named, around the entire circumference of the cylinder so that the saws are first passed by the brush members, then by the cleaning members and then by the beating members as the cylinder rotates.

The brush members 1 may be made in the usual manner of hair, fiber, or wire bristles secured to a suitable backing *b* attached to the cylinder so that the bristles project from the periphery of cylinder sufficiently to lightly contact with and overlap the edges of the saw S, as the cylinder rotates, and the brushes will remove any lightly adhering cotton from the saw teeth.

The cleaning members 2 are preferably made of leather, rubber or other suitable semi-elastic or resilient material and may be attached to the cylinder in any desired way, so as to project radially from the periphery of the cylinder about the same distance as the brushes, so that the outer edges of these cleaning members will slightly overlap the edges of the saws at the passing point. The outer edge of each cleaning member is slotted opposite each saw, and may be slotted by the action of the saws, so that the sides of the slot will almost contact with the sides of the saw teeth, (see Figs. 3 and 4) as the cleaning member moves therepast, and will wipe out of the teeth any moist or gummy cotton which might adhere thereto; said cleaning members removing from the saws any particles of cotton fiber which the brushes might not remove.

The beater members 3 are preferably formed of strips of sheet steel or iron attached to and extending longitudinally of the cylinder C, and projecting radially therefrom, preferably somewhat farther than the brushes or cleaning members; and each beater member is slotted on its outer edge, as at 3ª, opposite the saws, so that it cannot contact with the opposed saws, but the outer edge of the cleaning member will preferably project slightly inward past the edges of the saw. The beater members are adapted to strike any cotton pellets or little masses of cotton, or clogged cotton, which may be removed from the saw teeth by the brushes or cleaners, and disrupt or loosen up such pellets, or masses of cotton and loosen the fibers therein; and they also effectively prevent any "backlash" of cotton from the flue to the ribs, or clogging of the flue or ribs.

The leather or resilient cleaning members run close to the saw teeth but preferably not in absolutely rubbing contact therewith so as to avoid friction. In cleaning inferior grades of cotton or gritty cotton should any hard foreign substances, such as nails, grit or pebbles, get into the machine with the cotton, the cleaners 2 because of their nature will strike and remove such foreign substances without any danger of causing sparks by impact thereof against steel or iron, which sparks might ignite the cotton; the slots in the beaters 3 are so wide that there will be no danger of the latter catching any gravel or making same contact with the saws so as to produce any sparks.

In the operation of this machine; the brushes 1 remove from the saws any light cotton; the cleaners 2 remove any moist or gummy particles of cotton adhering to the saws, and the beaters 3 strike any pellets or lumps of cotton loosened from the saws and also act as fan blades; and as the brushes, cleaners and beaters follow each other in very rapid succession the saws are always kept clean, and damp and inferior grades of cotton can be thoroughly and successfully cleaned, and a better and more uniform grade of fiber can be obtained from a given grade of cotton by the use of my invention. The continual cleaning of the saws enables the gin to be operated indefinitely, because the saws will not clog and the presence of the beaters insures that any lumps or pellets of cotton which may be discharged from the saws will be loosened before the cotton is discharged from the machine.

This machine is particularly useful in handling dirty or inferior grades of cotton; and will effectively gin various grades of cotton which it has been heretofore necessary to clean before ginning, as my invention enables the gin to perform in a large measure the functions of both a cleaning machine and a gin.

What I claim is:

1. In a cotton gin; the combination with the saws; of a cylinder having a plurality of longitudinally disposed brush members, yieldable cleaning members, and rigid beating members, arranged in succession on its periphery, substantially as described.

2. In a cotton gin; the combination with the saws; of a cleaning cylinder coöperating with the saws and having a longitudinally disposed series of brushes, another series of longitudinally disposed semi-resilient cleaning members on its periphery arranged intermediate the brushes around the circumference of the cylinder, substantially as described.

3. In a cotton gin the combination with saws; of a cylinder having a series of longitudinally disposed brush members on its periphery, a series of longitudinally disposed cleaning members on the periphery of the cylinder arranged intermediate the brushes, the inner edges of said cleaning members being slotted to clean the saws, and a series of rigid beating members extending longitudinally of the cylinder and arranged intermediate the brushes and cleaning members, the inner edges of said beating members being slotted to prevent contact with the saws; said brushes, cleaners and beaters following each other in regular sequence around the circumference of the cylinder.

In testimony that I claim the foregoing as my own, I affix my signature.

JAMES T. SHUTE.